United States Patent
Zubiani et al.

(10) Patent No.: US 9,326,330 B2
(45) Date of Patent: Apr. 26, 2016

(54) DEVICE FOR THE LOCALIZED HEATING OF PARTS OF COATED METAL PIPES AND OF PARTS OF THEIR PROTECTIVE COATING

(75) Inventors: Ausonio Zubiani, Milan (IT); Stefano Miotto, Milan (IT)

(73) Assignee: TESI SPA, Milan (IT)

( * ) Notice: Subject to any disclaimer, the term of this patent is extended or adjusted under 35 U.S.C. 154(b) by 357 days.

(21) Appl. No.: 13/991,661

(22) PCT Filed: Dec. 7, 2011

(86) PCT No.: PCT/EP2011/006156
§ 371 (c)(1),
(2), (4) Date: Jun. 5, 2013

(87) PCT Pub. No.: WO2012/079720
PCT Pub. Date: Jun. 21, 2012

(65) Prior Publication Data
US 2013/0248519 A1    Sep. 26, 2013

(30) Foreign Application Priority Data

Dec. 16, 2010 (IT) ................. MI2010A2309

(51) Int. Cl.
| H05B 6/10 | (2006.01) |
| H05B 6/36 | (2006.01) |
| C21D 1/10 | (2006.01) |
| C21D 1/42 | (2006.01) |
| C21D 9/08 | (2006.01) |

(52) U.S. Cl.
CPC .. H05B 6/36 (2013.01); C21D 1/10 (2013.01); C21D 1/42 (2013.01); C21D 9/08 (2013.01); Y02P 10/253 (2015.11)

(58) Field of Classification Search
CPC .............. C21D 1/42; C21D 1/10; C21D 9/08; H05B 6/36
USPC ................. 219/600–612, 615–617, 629, 643, 219/672–674
See application file for complete search history.

(56) References Cited

U.S. PATENT DOCUMENTS

| 3,877,490 A | * | 4/1975 | Tsubouchi et al. | ........... 138/141 |
| 5,352,871 A | * | 10/1994 | Ross et al. | ...................... 219/633 |
| 5,821,507 A | * | 10/1998 | Sasaki et al. | .................. 219/622 |

(Continued)

FOREIGN PATENT DOCUMENTS

| FR | 28 227 27 | | 10/2002 |
| GB | 22 284 32 | | 8/1990 |
| JP | 06 248 350 | | 9/1994 |
| JP | 10072623 | * | 3/1998 |
| JP | 2004-211187 | | 7/2004 |

(Continued)

*Primary Examiner* — Dana Ross
*Assistant Examiner* — Joseph Iskra
(74) *Attorney, Agent, or Firm* — Abelman, Frayne & Schwab

(57) ABSTRACT

A device (10-10'), (11-11') for the localized heating of parts of metal pipes (12) connected to each other and of parts of primary plastic coating (16'-18') of the same pipes, all to be coated with protective material, comprises a spiral-wise development winding consisting of one or more coils (20) and of annular means that are arranged within and coaxially to said coil (20), at the parts of primary plastic coating (16'-18'), and that surround each one of said pipes (12) for heating by induction a zone (14) without primary plastic coating and for indirectly heating, by irradiation, end portions of the same provided with plastic coating (16'-18') contiguous to said zone (14).

8 Claims, 4 Drawing Sheets

(56) References Cited

U.S. PATENT DOCUMENTS

2006/0113010 A1* 6/2006 Saitou et al. ............... 148/570
2009/0321144 A1* 12/2009 Wyble et al. ............... 175/320

FOREIGN PATENT DOCUMENTS

| | | | |
|---|---|---|---|
| JP | 2007063642 | * | 9/2005 |
| JP | 2007-046108 | | 2/2007 |

* cited by examiner

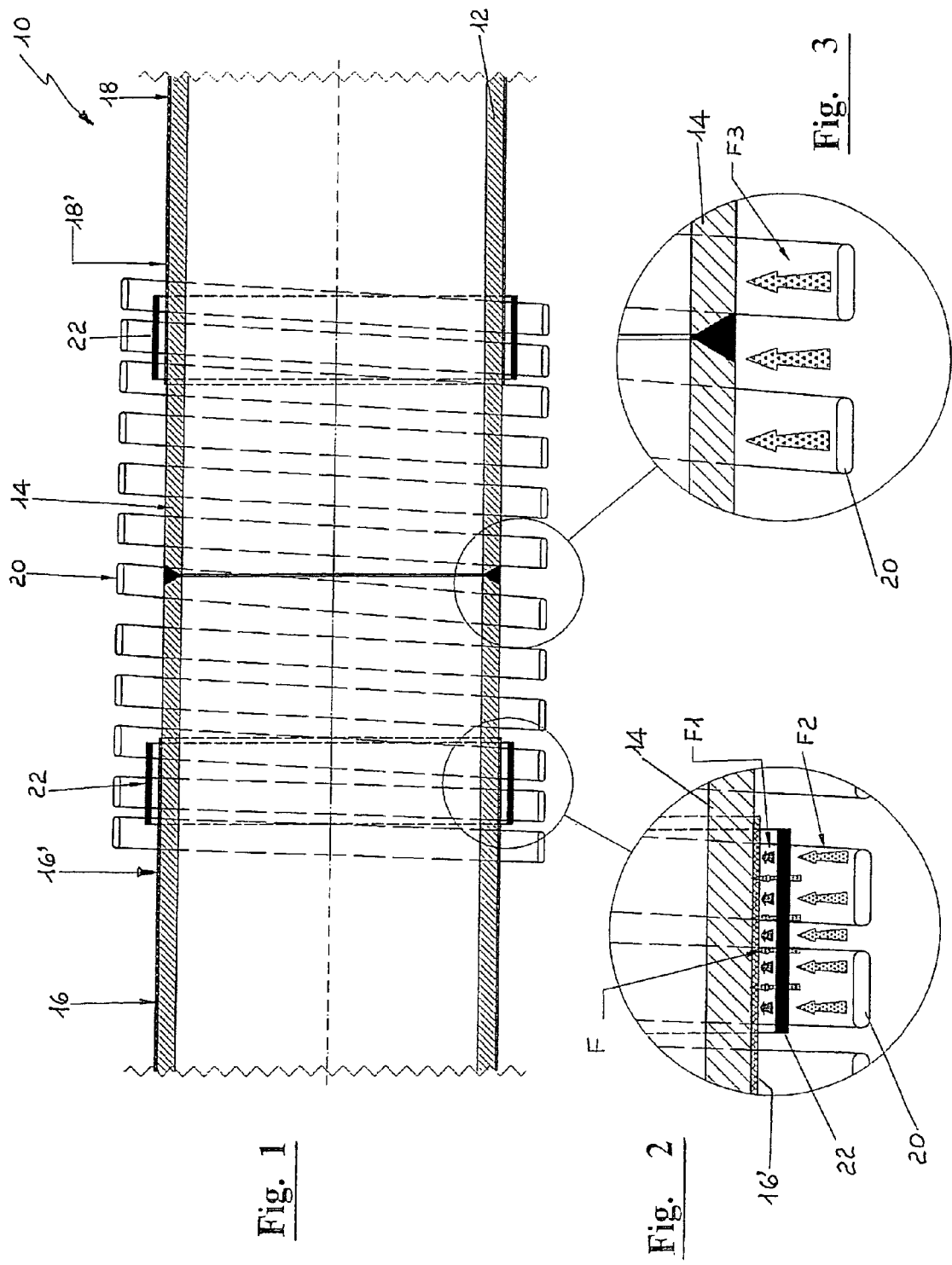

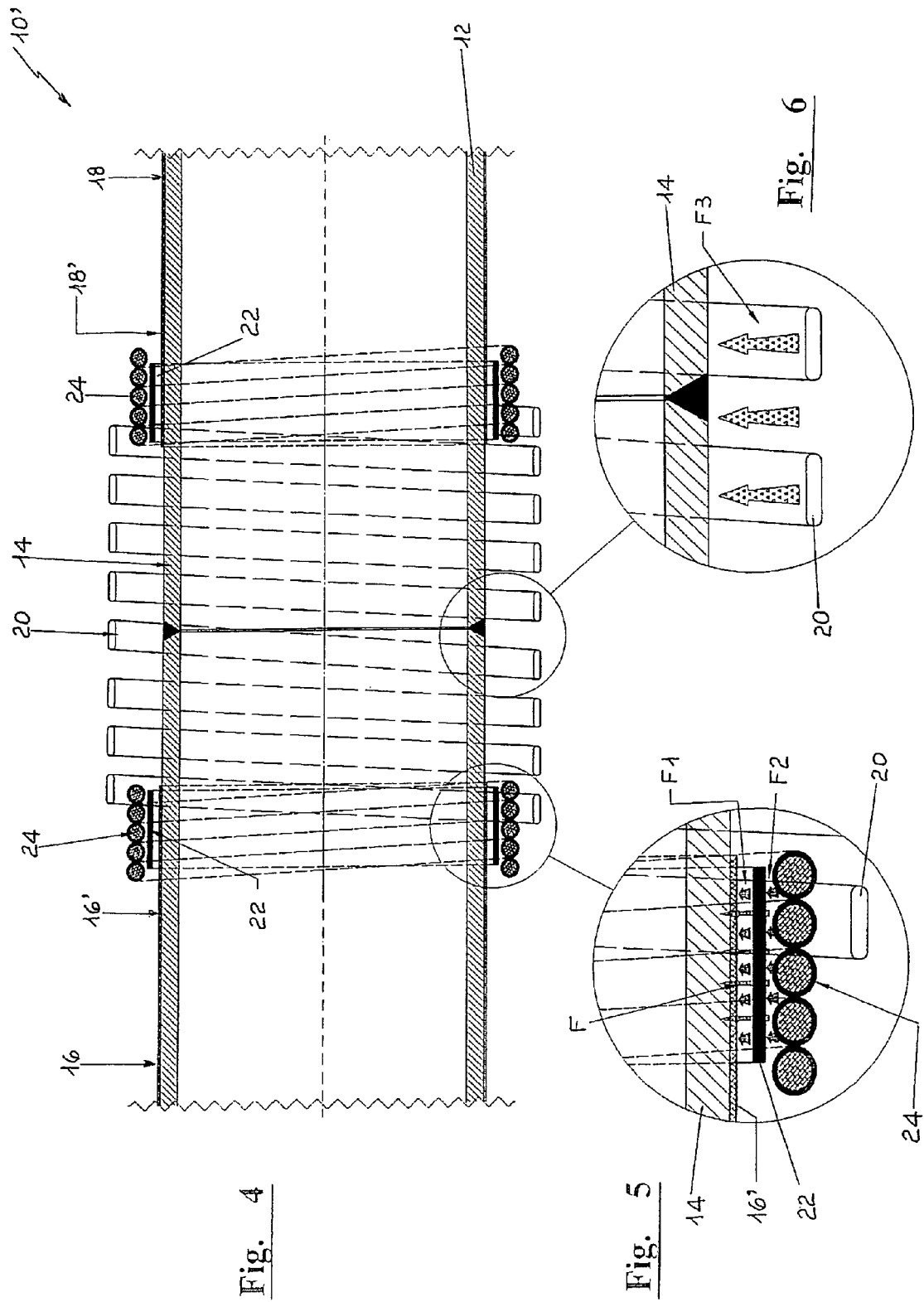

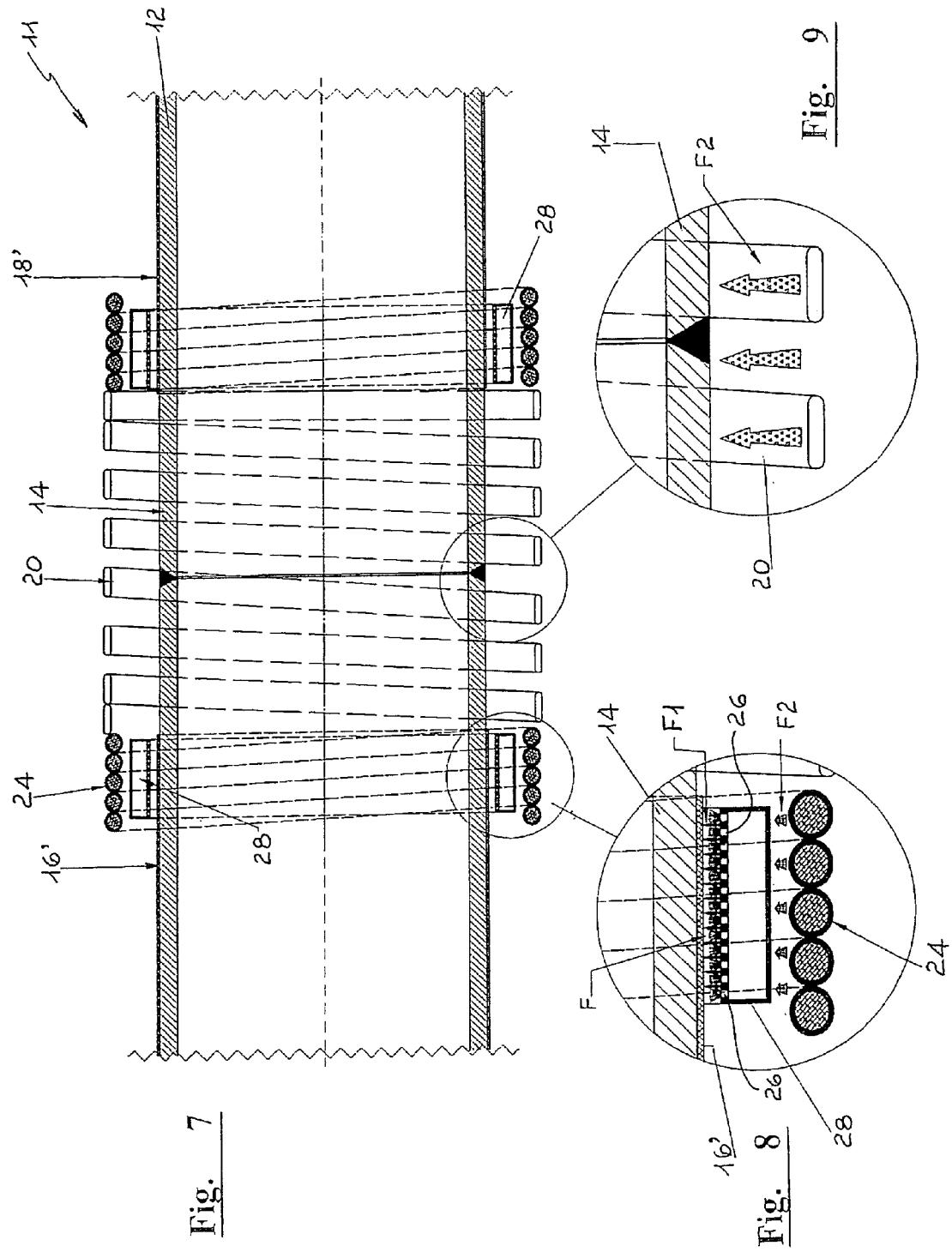

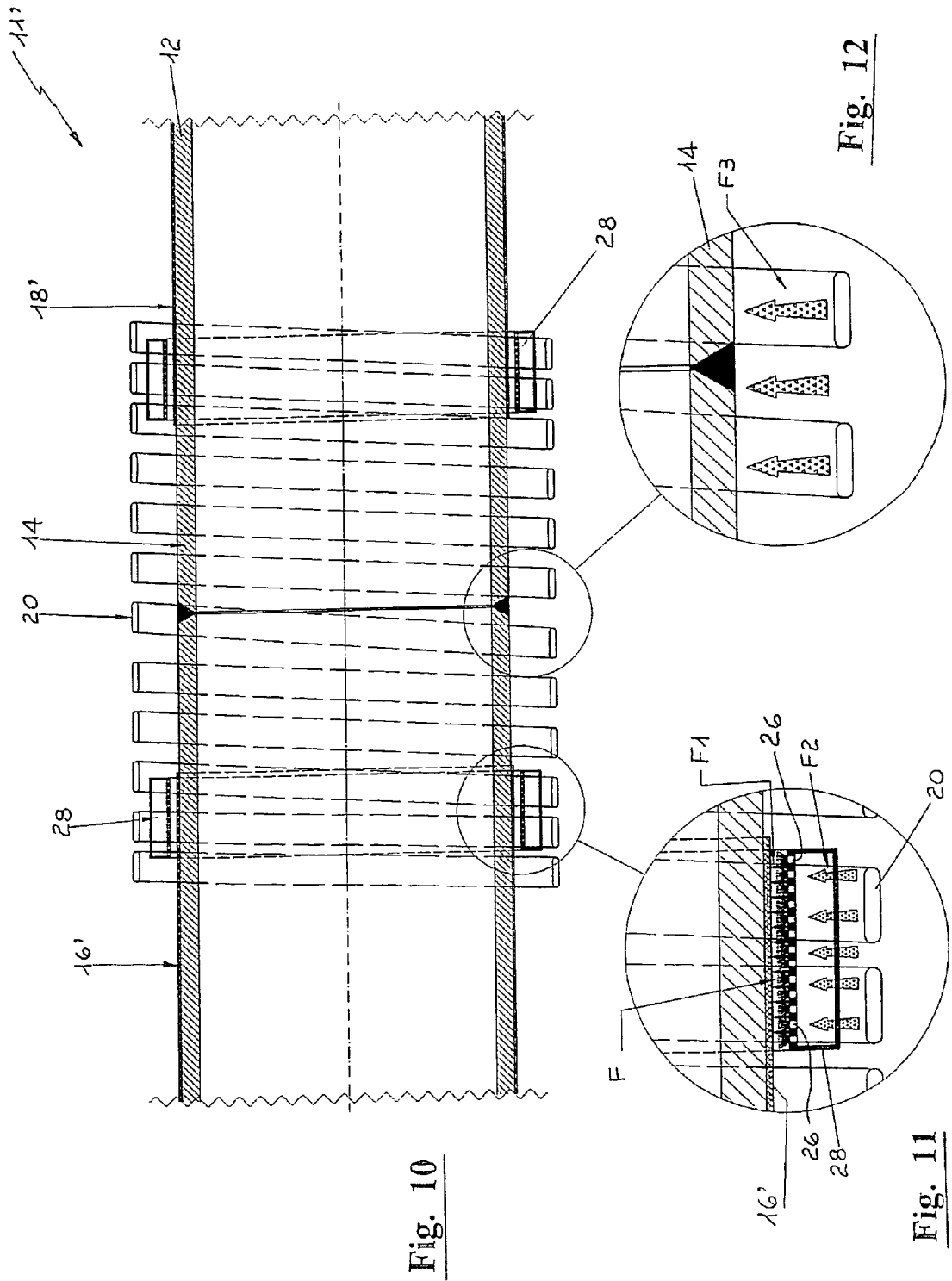

DEVICE FOR THE LOCALIZED HEATING OF PARTS OF COATED METAL PIPES AND OF PARTS OF THEIR PROTECTIVE COATING

The present invention relates to a device for the localized heating of parts of pipes to be coated with protective material.

More in particular, the present invention relates to a device that allows creating the temperature conditions suitable for coating the end portions of metal pipes connected to each other with heat-shrinking material based on cross-linked polyolefins for forming fluid carrying pipelines.

It is known that in making pipelines that make up networks or sections of gas pipelines or oil pipelines, metal pipes are used, provided with an outside protective coating. Such coating, typically of polyolefins, protects the exposed pipe surface especially when they are underwater or underground laying, that is, in the situations wherein the same pipes are subject to the attack of chemical agents present in the water and in the ground. The subject pipes are arranged into pieces having a length of several meters and are already provided at the origin with protective coating, except at the opposite ends. In such zones, in fact, the pipes are connected to each other by welding operations carried out on site, therefore the presence of a protective coating also at the ends thereof would cause a useless waste of time for removing respective portions of the same coating. Usually, at the opposite ends, said pipes exhibit a portion of about fifteen centimeters without coating.

After the welding that leads to the connection of two pieces of pipe to each other, it is therefore necessary to also protect the parts originally without coating, so as to ensure the continuity of the latter and prevent the onset of corrosive phenomena that would create serious drawbacks. This operation is currently carried out by heating both the metal pipe, in the part without protective coating, and the opposite pre-existing portions of coating with flames or through induction heating, so as to superimpose a band of protective material or a protective sheath to the entire heated zone. The continuity of the protective coating between the pipe pieces connected to each other is thus obtained.

However, this known embodiment that allows obtaining such continuity of the coating exhibits important drawbacks.

In the first place, the need of bringing both the metal part and the opposite end portions of the pre-existing coating to the same temperature should be taken into account; if the metal part is easily heated, the same does not happen with the coating, which is made of polyolefins and is therefore insulating. As a consequence, there is a great difficulty of bringing the two different parts to the same temperature for obtaining a satisfactory result. Moreover, the further drawback related to the substantial difference in the expansion coefficients of the materials subject to heating should be considered. The plastic, generally polyolefin, which forms the coating exhibits an expansion coefficient clearly higher than that of steel; as a consequence, subsequent to an intense localized heating, the original insulating coating tends to detach from the pipe, thus making the next operation difficult and sometimes critical.

During the laying of pipelines that form gas or oil conduits there is the further difficulty of not having the possibility of making cooling fluids flow within the pipes to be connected for controlling the temperature, since the laying procedure does not allow it. On the other hand, a cooling system of this type would in any case imply considerable operating difficulties and an increase in costs, even if it was used for pipelines not intended for the passage of hydrocarbons.

A method is known from JP 10072623 for cooling parts to be connected heated by induction, which envisages the insertion of a cooling pipe between the outside surface of the metal elements and the inside surface of the induction coil.

However, this solution does not envisage insulating coatings on the metal elements, thus the problem of a differentiated and calibrated heating for two different zones does not occur. A method is known from JP 2004211187 for the hot treatment of parts of a conduit, which however envisages a cooling system obtained by circulating fluid within the pipes; these last-mentioned, moreover, are not provided with insulating coating. Therefore, also in this case the problem of a differentiated and calibrated heating of different zones does not exist.

The same remarks apply as regards the solution claimed in JP 2007-046108, which envisages cooling means within a body heated by induction, and in JP 6248350 wherein the pipes are not provided with insulating coating and wherein the air circulation within the same pipes is prevented in advance.

US 2006/113010 and US 2009/321144 relate to thermal treatments for the surface hardening or stretching of pipes, without among the other things implying the need of heating parts of different materials in a differentiated and calibrated manner, and in particular they relate to a surface protective plastic coating.

The object of this invention is to obviate the drawbacks mentioned hereinabove.

More in particular, the object of the present invention is to provide for a device for the localized heating of parts of pipes to be coated with protective material suitable for making portions of the same pipes and of the relative pre-existing plastic coating as even as possible as regards the temperature.

A further object of the invention is to provide for a device as defined above which providing for heating the outside surface of the coating allows preventing the heating for the entire thickness of the plastic coating, and thus obviating phenomena of clearly different expansion of the materials to be worked.

A further object of the invention is to provide for a device suitable for ensuring a predetermined and diversified heating on the pipe surface on the one side, and of the plastic coating on the other, at the same time and using a single heating source.

Last but not least, an object of the invention is to provide for a device suitable for carrying out said diversified heating without the need for any cooling system.

A further object of the invention is to provide the users with a device for the localized heating of parts of pipes to be coated with protective material suitable for ensuring a high level of resistance and reliability of the added part of insulating coating over time.

These and other objects are achieved by the device for the localized heating of parts of pipes to be coated with protective material of the present invention according to the main claim. The construction and functional features of the device of the present invention shall be better understood from the following detailed description, wherein:

FIG. 1 schematically shows a side cutaway view of the device for the localized heating of parts of pipes to be coated with protective material of the present invention;

FIG. 2 shows an enlargement of a part of the pipe provided with protective coating according to FIG. 1;

FIG. 3 shows an enlargement of a part of the pipe without protective coating according to the same FIG. 1;

FIG. 4 schematically shows a side cutaway view of the device of the present invention according to an alternative embodiment;

FIG. 5 shows an enlargement of a part of the pipe provided with protective coating according to FIG. 4;

FIG. 6 shows an enlargement of a part of the pipe without protective coating according to the same FIG. 4;

FIG. 7 schematically shows a side cutaway view of the device of the invention according to a further alternative embodiment;

FIG. 8 shows an enlargement of a part of the pipe provided with protective coating according to FIG. 7;

FIG. 9 shows an enlargement of a part of the pipe without protective coating according to the same FIG. 7;

FIG. 10 schematically shows a side cutaway view of the device of the invention according to a further alternative embodiment;

FIG. 11 shows an enlargement of a part of the pipe provided with protective coating according to FIG. 10;

FIG. 12 shows an enlargement of a part of the pipe without protective coating according to the same FIG. 10.

With initial reference to FIGS. 1 to 3, the device of the present invention is globally indicated with reference numeral 10 and it surrounds a piece of metal pipe 12 which exhibits three differently configured contiguous sectors. In particular, the central zone 14 of pipe 12 is without protective coating whereas sectors 16 and 18 that extend on opposite sides starting from the central zone 14 are provided with protective plastic coating, indicated with reference numerals 16' and 18'. In the practice, said central zone without protective coating corresponds to an end portion of two pipes connected to each other by welding, it being provided that said protective coating is excluded at the origin along the opposite end zones of each metal pipe by a length generally comprised between 50.0 and 400.0 mm. Each pipe 12 is advantageously made of steel, whereas the protective coating that surmounts and adheres to the outside side surface of the same pipes is of polyolefin plastic material; said pipes 12 may exhibit any diameter and thickness.

According to the invention, device 10 for the localized heating of parts of pipes to be coated with protective material is used both along zone 14 without coating of pipe 12, and along sectors 16 and 18 that develop starting from the opposite sides of the same zone 14 and that are provided with polyolefin protective coating 16', 18' applied at the origin, that is, right after the forming of pipe 12. Said device 10 comprises a spiral-wise winding formed by one or more coils 20, suitable for heating by induction both zone 14 of pipe 12 without coating, and sectors 16 and 18 provided with protective coating. As is known, in induction heating a generator provides the alternating current that crosses a coil generating an alternating magnetic field therein; introducing a metal object within the magnetic field, it is run through by eddy currents induced by the magnetic field. The material resistivity, which opposes the flow of eddy currents, is the cause of the heat that is generated. Coil 20 forms a winding that extends along zone 14 and which also affects the adjacent sectors 16 and 18, but only said zone 14 that corresponds to the part of pipe 12 without coating is directly heated by induction. According to a fundamental feature of the invention, in fact, sectors 16 and 18 provided with coating 16', 18' are heated by coil 20 indirectly, that is, by irradiation. This happens since a metal ring device 22 is interposed between coil 20 and each one of sectors 16, 18, which remains suitably spaced apart from coating 16', 18' of said sectors, preventing damages thereto due to the heat derived from the same device. Rings 22 may for example be made of stainless steel, carbon steel, iron, aluminium, or other suitable materials and they exhibit a suitable thickness for reaching the required temperature and generally lower than that of pipe 12. In this way, zone 14 of pipe 12 and the ends contiguous thereto from coatings 16', 18' of sectors 16 and 18 are evenly heated, also because rings 22 are in a position close to said coatings within coil 20. While zone 14 is directly heated by induction, the ends of coatings 16' and 18' are especially heated on the surface by irradiation, by the heat that comes from the metal ring devices 22 in turn heated by induction. The thickness of said rings, the material they are made of and their distance from coatings 16' and 18' represent as many variables that are considered for obtaining about the same temperature gradient and the same final temperature of zone 14 on zones 16' and 18'. Such interposed devices that provide for the heating by irradiation are installed on the coil structure and are provided with suitable systems for adjusting the position thereof. They are also constructed so as to carry out the movements required for opening the coil, if this is of the opening type, and therefore suitably sectioned, if of the open or fractioned ring type, or provided with suitable contacts and/or connections if of the closed ring type.

In FIG. 2, arrow "F" indicates the possibility of partial heating by induction of the metal pipe in the part provided with coating (16'), whereas arrow "F1" indicates the heating of the same coating by irradiation. Arrow "F2", on the other hand, refers to the heating by induction of one of the metal ring devices 22. Arrow "F3" of FIG. 3, finally, highlights the direct heating flow by induction of zone 14 of pipe 12. FIGS. 4 to 6 refer to an alternative embodiment of the device of the present invention. For such solution, as well as the following ones of FIGS. 7 to 12, the same reference numerals of the preceding embodiment shall be used as regards common elements or parts. The ring heating device is indicated herein with reference numeral 10' and besides coil 20, it comprises two secondary coils 24. Said last-mentioned are arranged coaxially to coil 20, in a position close to the metal rings 22 and they are provided with an adjustment that is independent from coil or coils 20.

According to this solution, the heating of said ring devices is obtained by a supply source that is different and independently adjustable and therefore also the heat irradiated thereby on coatings 16', 18' leads to a more effective and accurate heating of the same.

In FIG. 5, arrow "F" schematises the zone where a possible partial heating by induction of the metal pipe occurs in the zone provided with coating 16', whereas arrow "F1" indicates the heating of the same coating by irradiation. Finally, figure "F2" indicates the heating by induction of one of the ring devices 22. Arrow "F3" in FIG. 5, on the other hand, defines the direct heating by induction of part 14 of the metal pipe 12.

According to the type of ring device, a part of the energy may be directly transferred to the end portions 16-18, and contribute to the heating, or holding the temperature, by conduction of the end portions 16', 18' of sectors 16-18.

FIGS. 7, 8 and 9 relate to a further alternative embodiment of the device of the present invention, indicated with reference numeral 11. According to such solution, metal hollow annular bodies 28 are used in place of ring 22, provided with a plurality of small through holes 26 along the side surface facing pipe 12. The hollow bodies 28, therefore, internally define an annular channel wherein a flow of ambient air is advantageously fed; such flow may be obtained with any means (not shown), such as for example with a compressor, a side channel blower, or with a centrifugal blower or equivalent. The air introduced into the cavity within each hollow body 28 is heated during the passage within the same ring, which is in turn heated by induction by the respective secondary coil 24, arranged in the same way as in the alternative solution of the preceding FIGS. 4, 5 and 6. Arrow "F" in FIG. 8 defines the zone where the heating by convection of the plastic coating 16' takes place by the hot air flow coming out of holes 26 of one of the hollow bodies 28; arrow "F1" in the same figure indicates the possible and partial heating of coating 16' by irradiation, whereas arrow "F2" in FIG. 8 defines the flow that heats by induction, starting from the secondary coil 24, the hollow annular body 28 with holes 26.

Arrow "F2" in FIG. 9, on the other hand, defines the direct heating by induction of the metal pipe 12 in zone 14. FIGS. 10, 11 and 12 relate to a further alternative embodiment of the device of the present invention, indicated with reference numeral 11'. According to such solution, the metal hollow annular bodies 28 provided with holes 26 are heated by induction directly by coil 20, the secondary coils 24 being excluded. In FIG. 11, arrow "F" indicates the heating of the plastic coating 16' by convection, through the hot air that comes out of the hollow bodies 28 wherein an ambient air flow is fed in the same way as the solution of the preceding FIGS. 7, 8 and 9. Arrow "F1" in FIG. 11 indicates the possible and partial heating of coating 16' by irradiation, whereas arrow "F2" in the same figure highlights the effect of heating by induction of one of the hollow bodies 28. Arrow "F3" in FIG. 12, on the other hand, defines the flow of the direct heating by induction of the metal pipe 12 in zone 14.

As can be noticed from the above, the advantages achieved by the invention are clear.

The device for the localized heating of parts of pipes of the present invention, in the various embodiments described, allows bringing both the metal, that is the uncoated part of pipe 14, and the adjacent sectors 16 and 18 that externally exhibit a protective coating 16', 18' of protective polyolefin plastic material, to an even temperature. Thanks to the heating that takes place partly by induction, partly by irradiation and partly also by convection in the alternative embodiment of FIGS. 7, 8, 9 and 10, 11, 12 starting from a coil 20 or optionally also from secondary coils 24, similar levels of temperature are achieved on the different zones and the differences due to the different expansion coefficients of the materials are balanced, preventing the primary coating from detaching from the pipe subsequent to an overall heating of the zone affecting the entire thickness of the protective coating. Thanks to this device it is therefore possible to apply, correctly and with guarantees of duration, with the induction heating only, a completion coating along the parts of pipes 12 that have been subject to welding, for connecting to each other two pieces with ends originally without such coating.

Although the invention has been described hereinbefore with particular reference to an embodiment thereof made by way of a non-limiting example, several changes and variations shall clearly appear to a man skilled in the art in the light of the above description. The present invention, therefore, is intended to include any changes and variations thereof falling within the spirit and the scope of protection of the following claims.

The invention claimed is:

1. A device (10-10'; 11-11') for localized heating a metal tube (12) having a central zone (14) and two sectors (16, 18) located on opposite sides of the central zone and contiguous to said central zone, each of said two sectors (16, 18) being provided with a layer of a primary plastic coating (16', 18') and said central zone (14) being without the primary plastic coating, (18'), said heating device comprising a spiral-wise winding having:
    at least one coil (20) having a diameter of said tube and extending along a portion of said central zone of said tube for heating the same by induction heating;
    at least two metal annular elements (22) located inside said winding on opposite sides of said at least one coil (20), respectively, each of said at least two metal annular elements having an inner diameter greater than a diameter of a respective sector coated with the plastic coating and extending along a portion of the respective sector to provide for heating the same by irradiation; and
    means for supplying said at least one coil with an alternating current and for controlling flow of the alternating current to said at least one coil.

2. A device according to claim 1, wherein said tube (12) is formed of two pipes partially coated with the plastic coating by adjoining and connecting end portions of said two pipes which are not provided with the plastic coating, said central zone (14) being formed by the end portions of said two pipes.

3. A device according to claim 1, wherein the annular metal elements are formed of one of metal rings (22) and annular hollow metal bodies (28).

4. A device according to claim 3, wherein each hollow metal body (28), along a side surface thereof facing the tube (12), is provided with a plurality of small through-holes (26).

5. A device according to claim 3, comprising means for feeding a flow of ambient air in each hollow metal body (28), and which is heated during passage within the body and contributes to heating of parts of said plastic coating (16'-18').

6. A device according to claim 1, further comprising two secondary coils (24) arranged between each of said metal annular elements (22 or 28) and the coil (20) and spaced therefrom.

7. A device according to claim 1, wherein a plastic material applied as coating (12) is based on polyolefins.

8. A method of localized heating a metal tube (12) having a central zone (14) and two sectors (16, 18) located on opposite sides of the central zone and contiguous to said central zone, each of said two sectors (16, 18) being provided with a layer of a plastic coating (16', 18'), said method comprising the steps of:
    heating a length of said tube (12) comprising a central zone (14) without plastic coating to a first temperature while at the same time heating two sectors (16, 18), each adjacent to said central zone 14 and provided with said plastic coating, to a second temperature lower than said first temperature,
    said first heating being carried out through induction and said second heating being mostly carried out through irradiation heat generated by said first heating.

* * * * *